United States Patent [19]

Bauer et al.

[11] Patent Number: 4,937,290
[45] Date of Patent: Jun. 26, 1990

[54] NYLON MODIFIED RUBBER COMPOSITION WHEREIN EITHER NYLON OR RUBBER OR BOTH ARE REACTED WITH A THIO ACID

[75] Inventors: Richard G. Bauer, Kent; James B. Pyke, Akron, both of Ohio

[73] Assignee: The Goodyear Tire & Rubber Company, Akron, Ohio

[21] Appl. No.: 248,696

[22] Filed: Sep. 26, 1988

[51] Int. Cl.$^5$ ............ C08L 13/00; C08L 23/32; C08L 23/16; C08L 77/00
[52] U.S. Cl. ............................ 525/184; 525/178
[58] Field of Search ............................ 525/184

[56] References Cited

U.S. PATENT DOCUMENTS

| | | | |
|---|---|---|---|
| 3,862,265 | 1/1975 | Steinkamp et al. | 525/193 |
| 4,513,123 | 4/1985 | Day et al. | 525/332.6 |
| 4,535,119 | 8/1985 | Tanibuchi et al. | |
| 4,639,495 | 1/1987 | Waggoner | 525/301 |
| 4,661,563 | 4/1987 | Sasaki et al. | 525/184 |
| 4,708,987 | 11/1987 | Hergenrother et al. | |
| 4,777,211 | 10/1988 | Lavengood et al. | 525/66 |

OTHER PUBLICATIONS

Fourth International Conference on Reactive Processing of Polymers, Oct. 29–31, 1986, Gardner Student Center, University of Akron (see especially Hoshino on pp. 22–27).

Primary Examiner—Lewis T. Jacobs
Assistant Examiner—Vasu S. Jagannathan
Attorney, Agent, or Firm—Alvin T. Rockhill

[57] ABSTRACT

It is desirable to increase the modulus of rubbers utilized in a wide variety of applications. This invention discloses a technique for modifying rubbers to improve their modulus without sacrificing other properties. The subject invention more specifically relates to a process for preparing a rubber composition having a high modulus which comprises reacting at least one thio acid with at least one polydiene rubber and at least one nylon.

11 Claims, No Drawings

NYLON MODIFIED RUBBER COMPOSITION WHEREIN EITHER NYLON OR RUBBER OR BOTH ARE REACTED WITH A THIO ACID

BACKGROUND OF THE INVENTION

It is sometimes desirable to increase the modulus of rubber compounds. For instance, it is generally desirable to increase the modulus of rubber compounds which are utilized in tire tread base compositions and in tire wire coat compounds. A higher degree of stiffness in such rubber compositions is conventionally attained by incorporating larger amounts of fillers, such as carbon black, into the rubber compounds and/or by increasing the state of cure of such compounds. Unfortunately, both of these techniques lead to undesirable results. For instance, the incorporation of additional carbon black into rubber compounds typically leads to high levels of hysteresis. Accordingly, the utilization of such compounds in tires results in excessive heat build-up and poor cut growth characteristics. The utilization of high amounts of sulfur to attain a high state of cure typically leads to poor aging resistance. Furthermore, it is highly impractical to reach high levels of stiffness by increased state of cure alone. For these reasons, it is not possible to attain the desired degree of stiffness in tire tread base compounds by simply adding higher levels of fillers or curatives.

SUMMARY OF THE INVENTION

The subject invention discloses a technique for modifying a rubber so as to greatly increase its modulus. This results in the rubber being better suited for applications where a high degree of stiffness is desirable. However, this modification procedure does not generally sacrifice other desirable characteristics of the rubber. For instance, the rubber compositions of this invention have an increased modulus but do not have an increased degree of hysteresis.

The rubber compositions of this invention are prepared by grafting nylon onto the rubber. This is done by reacting at least one thio acid with the rubber and at least one nylon. This procedure grafts polymer chains which are comprised of nylon onto the polymer chains of the rubber.

The subject invention specifically discloses a process for preparing a rubber composition having a high modulus which comprises reacting at least one thio acid with at least one polydiene rubber and at least one nylon. In most cases from about 2 phr to about 55 phr of nylon will be utilized in the modification procedure. It is generally preferred to react the nylon with the thio acid at a temperature which is within the range of about 180° C. to about 200° C. to form a modified nylon containing mercaptan groups and to subsequently react the modified nylon with the rubber at a temperature which is within the range of about 180° C. to about 200° C. However, such reactions will be carried out at a temperature which is at least as high as the melting point of the nylon.

The subject invention also reveals a process for preparing a rubber modified nylon composition which comprises reacting at least one thio acid with at least one polydiene rubber and from about 100 phr to about 5000 phr of at least one nylon.

DETAILED DESCRIPTION OF THE INVENTION

The process of this invention can be utilized to modify virtually any type of rubbery elastomer which contains double bonds. The rubbers which are modified in accordance with this invention typically contain repeat units which are derived from diene monomers, such as conjugated diene monomers and/or nonconjugated diene monomers. Such conjugated and nonconjugated diene monomers typically contain from 4 to about 12 carbon atoms and preferably contain from 4 to about 8 carbon atoms. Some representative examples of suitable diene monomers include 1,3-butadiene, isoprene, 2,3-dimethyl-1,3-butadiene, 2-methyl-1,3-pentadiene, 3,4-dimethyl-1,3-hexadiene, 4,5-diethyl-1,3-octadiene, phenyl-1,3-butadiene and the like. The polydiene rubber can also contain various vinyl aromatic monomers, such as styrene, 1-vinylnaphthalene, 2-vinylnaphthalene, α-methylstyrene, 4-phenylstyrene, 3-methylstyrene, and the like. Some representative examples of polydiene rubbers that can be modified by utilizing the procedure of this invention include polybutadiene, styrene-butadiene rubber (SBR), synthetic polyisoprene, natural rubber, isoprene-butadiene rubber, isoprene-butadiene-styrene rubber, nitrile rubber, carboxylated nitrile rubber, and EPDM rubber. The technique of this invention is particularly well suited for utilization in modifying natural rubber, synthetic polyisoprene, and cis-1,4-polybutadiene.

The thio acids which are utilized in modifying the polydiene rubber are compounds which contain at least one carboxyl group and at least one thiol group (mercaptan group). The thio acids that can be used can have the structural formula HS—A—COOH wherein A represents an alkylene group containing from about 1 to about 10 carbon atoms. Some representative examples of such thio acids include thio glycolic acid (mercapto acetic acid), thio lactic acid (2-mercaptopropionic acid), mercaptobutanoic acid, mercaptopentanoic acid, and mercaptohexanoic acid. Thio acids which contain one mercaptan group and two carboxyl groups can also be employed. Thio maleic acid is a representative example of such a thio acid which contains two carboxyl groups in addition to a mercaptan group. The most preferred thio acids for utilization in accordance with this invention are dithio diacids. Such dithio diacids have the general formula HOOC—A—S—S—A—COOH wherein A represents an alkylene group containing from 1 to about 10 carbon atoms. Some representative examples of such dithio diacids include dithio diacetic acid, dithio dipropanoic acid, dithio dibutanoic acid, dithio dipentanoic acid, and dithio dihexanoic acid. Dithio dipropanoic acid is the most highly preferred of the dithio diacids.

The utilization of mercaptans in chemical processes is generally associated with undesirable odors. However, dithio diacids can be utilized in the process of this invention with virtually no undesirable odors being generated. Additionally, dithio diacids react readily with both the polydiene rubber and the nylon being utilized in the modification procedure.

Virtually any type of nylon can be utilized in preparing the rubber compositions of this invention. These nylons are polyamides which can be prepared by reacting diamines with dicarboxylic acids. The diamines and dicarboxylic acids which are utilized in preparing such nylons will generally contain from about 2 to about 12 carbon atoms. Nylons can also be prepared by addition polymerization. Nylon which is prepared by reacting hexamethylene diamine with adipic acid (hexanedioic acid) can be utilized in the process of this invention. It is generally referred to as nylon-6,6 because it is derived from a diamine which contains 6 carbon atoms and a dicarboxylic acid which contains 6 carbon atoms. Nylon-6,6 typically has a number average molecular weight of 12,000 to 20,000, is exceptionally strong, abrasion resistant, and available from a wide variety of sources.

The nylons which are preferred for utilization in the process of this invention have melting points which are within the range of about 150° C. to about 255° C. Some representative examples of such preferred nylons include nylon-6,6, nylon-6, nylon-7, nylon-8, nylon-9, nylon-10, nylon-11, nylon-12 and nylon-6,12. The most preferred nylons have melting points which are within the range of about 175° C. to about 210° C. Some representative examples of such highly preferred nylons include nylon-8, nylon-9, nylon-10, nylon-11 and nylon-12.

Polycapryllactam, which is generally referred to as nylon-8, is generally prepared by polymerizing capryllactam. This polymerization takes place readily in the melt with a small amount of amino acid initiator. Capryllactam is prepared by dimerization of butadiene to cyclooctadiene, which is hydrogenated to cycloctane, oxidized to cycloctanone, converted to the oxime with hydroxylamine, and subjected to the Beckmann rearrangement. Nylon-8 has a melting point of 200° C.

Poly(ω-aminoundecanoic acid), known as nylon-11, can be prepared by the melt polymerization of ω-aminoundecanoic acid under an inert gas atmosphere at a temperature of about 215° C. Nylon-11 has a melting point of 190° C.

Nylon-12 or poly(ω-dodecanolactam) is normally prepared by the polymerization of ω-dodecanolactam at a high temperature of at least about 300° C. utilizing an acid catalyst. ω-dodecanolactam is prepared by trimerization of butadiene to cyclododecatriene, the subsequent hydrogenation to cyclododecane, followed by oxidation to cyclododecanone, which is converted to the oxime with hydroxylamine, with the oxime being rearranged by Beckmann rearrangement to yield the ω-dodecanolactam. Nylon-12 has a melting point of 179° C. and is very highly preferred for use as the nylon in the process of this invention.

The nylons used in the process of this invention will typically have number average molecular weight which is within the range of about 8,000 to about 40,000. Such nylons will more typically have number average molecular weights which are within the range of about 10,000 to about 25,000. The nylon utilized can be capped or can have free primary amine end groups. However, nylons having free amine end groups are believed to react more quickly with thio acids and are accordingly preferred.

The modified rubber compositions of this invention are prepared by simply reacting the thio acid with the polydiene rubber and the nylon. This can be accomplished by simply mixing the thio acid homogeneously throughout a blend of the polydiene rubber and the nylon and heating the thio acid/nylon/polydiene rubber blend. The mercaptan groups on the thio acid will add to double bonds present in the polydiene rubber and the carboxyl groups in the thio acid will react with amine groups present in the nylon. This reaction causes nylon chains to be grafted onto the backbone of the polydiene rubber. This reaction can be depicted as follows:

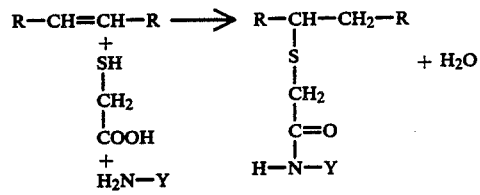

wherein R represents chains of the rubber and wherein Y represents polymer chains of the nylon. In the reaction depicted, thio glycolic acid was utilized to graft nylon onto the polydiene rubber.

The modification procedure of this invention can be carried out utilizing several satisfactory techniques. For instance, the thio acid, nylon, and polydiene rubber can be simultaneously mixed together and heated to graft the nylon onto the rubber. In another scenario, the thio acid can be reacted with the rubber to produce a rubber having carboxyl groups bound thereto and the rubber can then be subsequently reacted with the nylon to produce the modified rubber of this invention. In the preferred technique of this invention, the thio acid is first reacted with the nylon to produce a modified nylon containing mercaptan groups and the modified nylon is subsequently reacted with the rubber. It is preferred to prereact the thio acid with the nylon in a first reaction step and to subsequently react the reaction product with the rubber because the rubber is subjected to elevated temperatures for a shorter duration of time and accordingly less degradation occurs.

The reaction between the thio acid and the nylon will typically be carried out at a temperature which is within the range of about 150° C. to about 300° C. It will preferably be carried out at a temperature which is within the range of about 165° C. to about 250° C. and will more preferably be conducted at a temperature which is within the range of about 180° C. to about 200° C. The reaction between the rubber and the nylon will typically be carried out at a temperature which is within the range of about 120° C. to about 250° C. In most cases it will be preferred to carry out the reaction between the thio acid and the rubber at a temperature within the range of about 125° C. to about 200° C. with the most preferred temperature range for the reaction being from about 130° C. to about 150° C. In cases where the thio acid is reacted with the nylon and the rubber simultaneously, a temperature which is within the range of about 150° C. to about 250° C. will be utilized. In such cases the simultaneous reaction between the thio acid, the nylon, and the rubber will more preferably be carried out at a temperature which is within the range of about 165° C. to about 200° C. However, reactions between the thio acid and the nylon and reactions between the rubber and modified nylon containing mercaptan groups will be carried out at a temperature which is at least as high as the melting point of the nylon. In other words, reactions which are carried out in the presence of nylon will be conducted at a temperature which is at least as high as the melting point of the nylon. In most cases, preferred reaction temperatures will be slightly above the melting point of the nylon.

The thio acid is mixed throughout the rubber and/or the nylon utilizing conventional mixing procedures. For example, the mixing can be carried out in a Banbury mixer or a mill mixer. Normally, such blends will be prepared by mixing from about 2 phr to about 55 phr (parts per hundred parts of rubber) of the nylon throughout the polydiene rubber. The nylon can, of course, be prereacted with the thio acid prior to mixing it with the rubber. In most cases it will be preferred to utilize from about 10 phr to about 50 phr of nylon in the blend. It will be typically more preferred to utilize from about 20 phr to about 45 phr of nylon in the blend. The amount of thio acid utilized will typically be within the range of about 0.1 phr to about 20 phr. In most cases it will be preferred to utilize from about 0.5 phr to 3 phr. It is generally most preferred to utilize from about 0.8 phr to about 2 phr of the thio acid.

This invention is illustrated by the following working examples which are presented merely for the purpose of illustration and are not to be regarded as limiting the scope of the invention or the manner in which it can be practiced. Unless specifically indicated otherwise, parts and percentages are given by weight.

EXAMPLES 1-4

In this series of experiments, high cis-1,4-polyisoprene was modified in accordance with the process of this invention. In the procedure utilized, 1,150 grams of high cis-1,4-polyisoprene was mixed with 11.5 grams of dithiodipropionic acid, and 5.75 grams of thiodiphenyl amine (a high temperature antidegradant) in a laboratory size Banbury mixer which was operated at a temperature of 130° to 150° C. at an initial speed of 70 rpm which was reduced to 40 rpm after about 5 minutes to reduce temperature build up. The Banbury was run at 40 rpm for two additional minutes. During this procedure dithiodipropionic acid reacted with some of the double bonds in the high cis-1,4-polyisoprene to produce a rubber having carboxyl groups bound thereto. In Example 1 200 grams of the carboxylated polyisoprene produced was mixed with 50 grams of nylon-12 and 1 gram of diaryl-p-phenylene diamine in a 280 gram preparative Brabender mixer which was operated at 196° C. for a mixing period of about 7 minutes. In Example 2, 185 grams of the carboxylated polyisoprene was mixed with 64.8 grams of nylon-12 and 0.8 grams of diaryl-p-phenylene diamine in the Brabender mixer for a period of about 7 minutes at a temperature which was within the range of 190° to 195° C. In Example 3, the procedure utilized in Example 2 was repeated except that 200 grams of the polyisoprene was mixed with 50 grams of nylon-12. In Example 4, the procedure utilized in Example 2 was also repeated except that 173 grams of the high cis-1,4-polyisoprene was mixed with 77.9 grams of the nylon-12. In Examples 1 and 3, 25 phr of nylon-12 was utilized. In Examples 2 and 4, 35 phr and 45 phr of nylon-12 was utilized, respectively.

The rubber compositions made were compounded with 45 phr or carbon black, 9 phr of an oil, 2 phr of N-phenyl-N'-(1,3-dimethylbutyl)-p-phenylenediamine, 1 phr of diaryl-p-phenylene diamine, 1 phr of a wax, 3 phr of stearic acid, 3 phr of zinc oxide, 0.8 phr of N-oxydiethylene benzothiazole-2-sulfenamide, 0.4 phr of guanidine, and 1.6 phr of insoluble sulfur. The rubber compositions were then cured at 300° F. (149° C.) for 25 minutes. The 50% modulus, 100% modulus, tensile strength and elongation of the cured rubber samples made are reported in Table I.

TABLE I

| Example | 50% Modulus* | 100% Modulus* | Tensile Strength* | Elongation |
|---------|--------------|---------------|-------------------|------------|
| 1 | 5.2 | 9.0 | 16.5 | 250% |
| 2 | 4.4 | 7.2 | 12.5 | 220% |
| 3 | 5.0 | 9.1 | 16.8 | 220% |
| 4 | 4.8 | 8.3 | 12.1 | 160% |

*Given in Mega Pascals

As can be determined by reviewing Table I, very significant improvements in the modulus and tensile strength of the polyisoprene were realized by utilizing the modification procedure of this invention. For instance, in Example 3 a 50% modulus of 5.0 MPa and a 100% modulus of 9.1 MPa was realized. The rubber compositions made also had very high tensile strength. For instance, the tensile strength of the rubber composition prepared in Example 3 was 16.8 MPa. The rubber compositions made possessed a greater bending modulus and increased stretching modulus at low elongation.

While certain representative embodiments and details have been shown for the purpose of illustrating the subject invention, it will be apparent to those skilled in this art that various changes and modifications can be made therein without departing from the scope of the subject invention.

What is claimed is:

1. A process for preparing a rubber composition having a high modulus which comprises reacting at least one dithio diacid having the general structural formula HOOC—A—S—S—A—COOH wherein A represents an alkylene group containing from 1 to about 10 carbon atoms with at least one polydiene rubber selected from the group consisting of polybutadiene, styrene-butadiene rubber, synthetic polyisoprene, natural rubber, isoprene-butadiene rubber, isoprene-butadiene-styrene rubber, nitrile rubber and carboxylated nitrile rubber and at least one nylon.

2. A process as specified in claim 1 which is carried out by reacting the dithio diacid with the nylon to form a modified nylon containing mercaptan group; and subsequently reacting the modified nylon containing mercaptan groups with the polydiene rubber.

3. A process as specified in claim 2 wherein the dithio diacid is reacted with the nylon at a temperature which is within the range of about 150° C. to about 300° C. and wherein the modified nylon containing mercaptan groups is reacted with the polydiene rubber at a temperature which is within the range of about 120° C. to about 250° C.

4. A process as specified in claim 3 wherein the nylon is selected from the group consisting of nylon-6,6, nylon-6, nylon-7, nylon-8, nylon-9 nylon-10, nylon-11, nylon-12, and nylon-6,12.

5. A process as specified in claim 4 wherein said polydiene rubber is selected from the group consisting of polybutadiene, styrene-butadiene rubber, synthetic polyisoprene, natural rubber, isoprene-butadiene rubber, isoprene-butadiene-styrene rubber, nitrile rubber, and EPDM rubber.

6. A process as specified in claim 5 wherein from about 0.5 phr to about 3 phr of the dithio diacid is utilized.

7. A process as specified in claim 6 wherein said dithio diacid is dithio dipropionic acid.

8. A process as specified in claim 1 wherein a rubber containing carboxyl groups was prepared by reacting a polydiene rubber with a dithio diacid.

9. A process as specified in claim 8 wherein the rubber containing carboxyl groups was prepared at a temperature within the range of about 125° C. to about 200°C.

10. A process as specified in claim 9 wherein the dithio diacid is dithio dipropionic acid.

11. A process as specified in claim 10 wherein the nylon is nylon-12.

* * * * *